UNITED STATES PATENT OFFICE.

HEINRICH LUDWIG DIEHL, OF DARMSTADT, GERMANY, ASSIGNOR TO DR. F. VON HEYDEN NACHFOLGER, OF RADEBEUL, GERMANY.

TAR ESTER OF FATTY ACIDS AND PROCESS OF MAKING SAME.

SPECIFICATION forming part of Letters Patent No. 655,208, dated August 7, 1900.

Application filed September 19, 1893. Serial No. 485,871. (Specimens.)

*To all whom it may concern:*

Be it known that I, HEINRICH LUDWIG DIEHL, doctor of philosophy, a subject of the Grand Duke of Hesse, residing at Darmstadt, in the Grand Duchy of Hesse, Germany, have invented new and useful Improvements in the Manufacture of Acid Esters of Creosote, Guaiacol, and Creosol, of which the following is a specification.

This invention relates to the manufacture of acid esters of creosote, guaiacol, and creosol. In particular the esters of oleic acid and stearic acid are contemplated; but other acids obtainable from fatty matters can be employed—as, for example, caprylic, capric, lauric, myristic, palmitic, arachidic, cerotic, ricinic acids, linoleic acid, erucic acid, caproic acid, and sebacic acid.

The production of the ester is effected by the reaction under heating of dehydrating agents—such as phosphorus trichlorid, phosphorus oxychlorid, phosphorus pentachlorid, sulphuric-chlorid, ($SO_2Cl_2$,) carbon oxy-chlorid, ($COCl_2$,) alkali sulfates, and the like—upon a mixture of, for example, oleic acid or stearic acid or their salts, on the one hand, with creosote, guaiacol, or creosol, or their salts, on the other hand. This process can also be carried out in two distinct phases by first causing the said chlorin compounds to act upon the said acids or salts and then causing the acid chlorid so produced to react upon the said phenols or their salts. The commercial stearic acid, which consists of a mixture of stearic acid and palmitic acid, may be used.

The process will be rendered clear by the following example:

Eighty-five parts of creosote (*Pharm. Germ.* III) are mixed with seventy parts of oleic acid, and to the mixture are added forty parts of phosphorus trichlorid, whereupon the mixture is gradually heated to 135° centigrade in an oil-bath. The mixture is maintained at this temperature until the production of hydrochloric-acid vapors ceases. The reaction product is freed from acids and by-products by washing with water and is then in the form of a yellow oil of a mild pleasant flavor, reminding somewhat of creosote. It is insoluble in water, soluble with difficulty in ninety per cent. alcohol, soluble in absolute alcohol, ether, benzene, chloroform, fats, oils, &c. With the white or yolk of eggs or gum-arabic and water it readily forms an emulsion and is in its behavior very similar to oils. By means of alkalies it is readily saponified, more slowly by means of water or acids. From the alkaline-soap solution acids separate oil smelling strongly of creosote, which has an extraordinarily-caustic action upon mucous membranes, as it again contains free creosol together with the oleic acid.

In an analogous manner the esters of oleic and stearic acids, on the one hand, and of guaiacol and creosol, on the other hand, are obtained. In the following the new esters of these two acids will be more particularly characterized.

I. The oleic acid-creosote-ester of beech-wood-tar creosote (*Ph. Germ.* III) produces an oil which is insoluble in water, soluble with difficulty in ninety per cent. alcohol, and readily soluble in absolute alcohol, ether, benzene, chloroform, disulphid of carbon, fatty oils, &c. By the reaction of nitric acid in the presence of mercury (nascent nitrous acid) it is converted into the ester of the isomeric elaidic acid.

II. The stearic acid-creosote-ester of beech-wood-tar creosote (*Ph. Germ.* III) is a pale yellow oil insoluble in water, soluble with difficulty in ninety per cent. alcohol, easily soluble in absolute alcohol, ether, benzin, sulphid of carbon, fatty oils, &c.

III. The oleic acid-creosote-ether from mineral coal-tar creosote is an oil insoluble in water, soluble with difficulty in ninety per cent. alcohol, readily soluble in absolute alcohol and the usual solvents of fats. By the reaction of nascent nitrous acid it is converted into the ester of elaidic acid.

IV. The stearic acid ester from coal-tar is oily. It shows partially-indistinct crystallization in the cold, which, however, disappears again at ordinary temperature. It is insoluble in water, soluble with difficulty in ninety per cent. alcohol, easily soluble in the repeatedly above-named solvents of the fats.

V. The oleic acid-guaiacol ester is oily. It is transformed, like the above-mentioned oleic acid ester, into elaidic acid ester. It is insoluble in water, soluble with difficulty in ninety per cent. alcohol, easily soluble in absolute alcohol, ether, benzin, chloroform, fatty oils, &c.

VI. The stearic acid-guaiacol ester is a slightly-colored oil easily soluble in absolute alcohol, ether, benzene, chloroform, &c., less easily in ninety per cent. alcohol, and insoluble in water.

VII. The oleic acid-creosote-ester is also oily. It shows, like the other oleic acid esters, the elaid in reaction. Like the above-named substances, it is insoluble in water, soluble with difficulty in ninety per cent. alcohol, easily soluble in absolute alcohol, ether, benzene, disulphid of carbon, chloroform, fatty oils, &c.

VIII. The stearic acid-creosol ether is an oily liquid insoluble in water, soluble with difficulty in ninety per cent. alcohol, easily soluble in the other above-mentioned solvents.

All these esters boil with decomposition at temperatures of about 300° centigrade.

The esters of the oleic acid readily take up bromin under considerable heating. The saponification is more difficult with the stearic acid esters than with those of oleic acid.

The guaiacol, creosol, and creosote ester of the other acids are obtained in precisely the same manner as in the above examples, the oleic or stearic acid being replaced by equivalent quantities of the first above-named acids. In this way the following new bodies are obtained: caprylate of guaiacol, creosol, and creosote, ($C_7H_{15}COOR$;) caprinate of guaiacol, creosol, and creosote, ($C_9H_{19}COOR$;) laurinate of guaiacol, creosol, and creosote, ($C_{11}H_{23}COOR$;) myristinate of guaiacol, creosol, and creosote, ($C_{13}H_{27}COOR$;) palmitinate of guaiacol, creosol, and creosote, ($C_{15}H_{31}COOR$;) arachinate of guaiacol, creosol, and creosote, $C_{19}H_{39}COOR$;) cerotinate of guaiacol, creosol, and creosote, ($C_{26}H_{53}COOR$;) ricinolate of guaiacol, creosol, and creosote, ($C_{17}H_{33}COOR$;) linolate of guaiacol, creosol, and creosote, ($C_{15}H_{27}COOR$;) erucate of guaiacol, creosol, and creosote, ($C_{21}H_{41}COOR$;) capronate of guaiacol, creosol, and creosote, ($C_9H_{11}O_2$-R;) sepacinate of guaiacol, creosol, and creosote, ($C_{10}H_{16}O_4$-$R_2$.) In these formulæ R indicates the guaiacol, creosyl, and creosote radical. All the said esters are oil-like substances of neutral reaction insoluble in water, soluble in alcohol and ether. All the said esters are free from the intense smell and flavor of creosote, guaiacol, and creosol. They do not act caustically or burning upon mucous membranes like those substances do, and they are intended to replace them for medicinal purposes. They are saponified by means of alkalies and in the organic system.

As remedial agents the esters may be used either internally or externally. They are generally used internally, beginning with a dose of 0.1 gram daily, which may be gradually increased to thirty grams.

I claim—

1. The herein-described process of producing non-caustic esters of high molecular weight, insoluble in water and soluble in alcohol, ether and benzin, which consists in reacting upon fatty acids with beech-wood tar in the presence of a condensing agent.

2. As a new article of manufacture, a non-caustic fatty acid ester of beech-wood tar, insoluble in water and soluble in alcohol, benzin and ether.

3. As a new article of manufacture, a non-caustic fatty acid ester of guaiacol, insoluble in water and soluble in alcohol, benzin and ether.

In testimony whereof I have signed my name to this specification in the presence of two subscribing witnesses.

HEINRICH LUDWIG DIEHL.

Witnesses:
AUGUST WEBER,
FRIEDRICH LOCHMANN.